United States Patent [19]
Petitto et al.

[11] Patent Number: 5,774,260
[45] Date of Patent: *Jun. 30, 1998

[54] TECHNIQUE FOR DEPTH OF FIELD VIEWING OF IMAGES WITH INCREASED CLARITY AND CONTRAST

[76] Inventors: Tony Petitto, 346 N. Palm Dr., Beverly Hills, Calif. 90210; Stanislaw Loth, 44 Normandy Village - 44, Nanvet, N.Y. 10954

[ * ] Notice: The term of this patent shall not extend beyond the expiration date of Pat. No. 5,400,177.

[21] Appl. No.: 345,806

[22] Filed: Nov. 22, 1994

Related U.S. Application Data

[63] Continuation-in-part of Ser. No. 155,748, Nov. 23, 1993, Pat. No. 5,400,177.

[51] Int. Cl.$^6$ .................................................. G03B 21/56
[52] U.S. Cl. .......................................... 359/451; 359/460
[58] Field of Search ..................................... 359/451, 448, 359/449, 456, 460, 478; 348/44, 59, 832

[56] References Cited

U.S. PATENT DOCUMENTS

| | | |
|---|---|---|
| 2,449,886 | 9/1948 | Dougherty . |
| 2,889,739 | 6/1959 | Moore . |
| 2,891,444 | 6/1959 | Ewald . |
| 3,784,742 | 1/1974 | Burnham et al. . |
| 3,820,873 | 6/1974 | Redington et al. . |
| 4,078,854 | 3/1978 | Yano ........................................ 350/128 |
| 4,158,481 | 6/1979 | Hoyer . |
| 4,309,074 | 1/1982 | Granieri, Jr. . |
| 4,414,565 | 11/1983 | Shanks . |
| 4,621,897 | 11/1986 | Bonnet . |
| 4,708,435 | 11/1987 | Yata et al. ................................ 350/129 |
| 4,772,094 | 9/1988 | Sheiman . |
| 4,871,233 | 10/1989 | Sheiman . |
| 4,927,238 | 5/1990 | Green et al. . |
| 5,061,052 | 10/1991 | DeJesus . |
| 5,146,365 | 9/1992 | Minoura et al. . |

FOREIGN PATENT DOCUMENTS

| | | |
|---|---|---|
| 40 06 868 A1 | 9/1991 | Germany . |
| 2 184 286 | 6/1987 | United Kingdom . |
| WO 81/01201 | 4/1981 | WIPO . |

OTHER PUBLICATIONS

International Application No. PCT/GB80/00167, Filed Oct. 15, 1980, "Method Apparatus for Producing Three–Dimensional Displays."
IBM Technical Disclosure Bulletin, vol. 10, No. 5, Oct. 1967, "Real Time Computer–Generated 3–D Display," by R.V. Pole and R.A. Thorpe, pp. 601–603.

*Primary Examiner*—Daniel P. Malley
*Attorney, Agent, or Firm*—Howrey & Simon; Joseph A. Micallef

[57] ABSTRACT

A screen is disclosed for viewing depth of field images. The screen includes a prismatic screen mounted between a flat image and a viewer. Additional optical elements may be provided to enlarge a viewed image. A light hood may be provided to reduce glare and other effects of ambient light. Further protection from ambient light may be provided by coating the screen with an anti-reflective coating. Image quality for a video image or the like is provided by restructuring the image into smaller image elements. The present invention may find particular application in medical and obstetric imaging such as sonograms, musculo-skeletal imaging, vascular imaging, angiograms, angioplasty, dental probes, catheter probes, ear probes, endoscopy, laparoscopy, pelviscopy and arthroscopy.

20 Claims, 12 Drawing Sheets

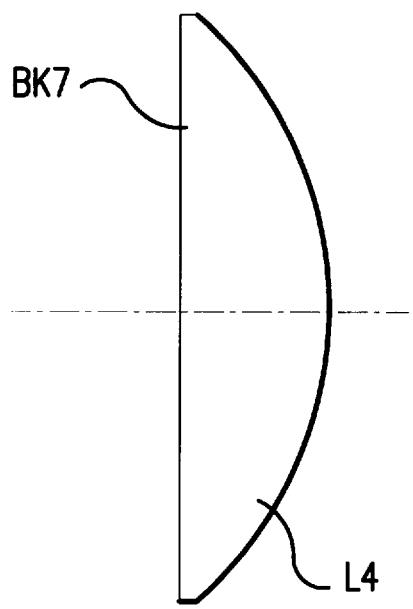
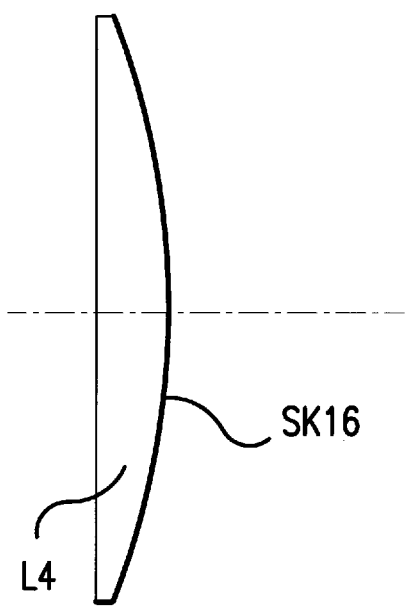
FIG.6A  FIG.6B
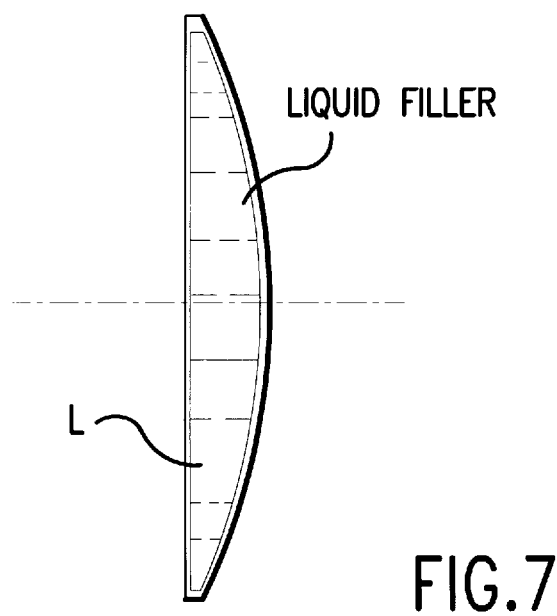
FIG.7

TECHNIQUE FOR DEPTH OF FIELD VIEWING OF IMAGES WITH INCREASED CLARITY AND CONTRAST

BACKGROUND OF THE INVENTION

The present invention is a continuation-in-part of co-pending allowed U.S. patent application Ser. No. 08/155,748, filed Nov. 23,1993 by Tony Petitto and Stanislaw Loth, for "Technique for Depth of Field Viewing of Images With Improved Clarity and Contrast," now U.S. Pat. No. 5,400,177 which is hereby incorporated by reference in its entirety.

Depth of field viewing, as described in application Pat. No. 5,400,177 is accomplished by enhancing depth cues which are present in every flat image, whether photographed or recorded electronically, without the requirement of special glasses, eye shutters or similar devices used in front of the viewers eyes. The depth cues are enhanced by a specially designed prismatic screen which separates the viewer's eye focus and convergence. The separation triggers the brain of the viewer to disregard convergence information indicating that the screen is flat, and to interpret the image depth cues as real.

To strengthen the focus and convergence separation and add additional image magnification, the preferred embodiment of the present invention utilizes a specially designed magnifying lens as a supplement to the prismatic screen. The lens helps trigger the eye focus and convergence separation—making it stronger when combined with a prismatic screen such as is disclosed in application patent No. 5,400,177. In addition, depending upon the particular design of the lens, the viewed image may magnified from 1.5× to 2.×, and at the same time is cleared (cleaned) from the magnified raster of the video scanning lines. The clearing (cleaning) of the viewed image from the magnified raster is accomplished with the prismatic screen, as described in the parent application. With particular reference to FIGS. 29 to 36 of that application, the prismatic screen PR preferably includes three miniature prisms for each video scan line. As a result, each raster video scan line is divided two or three times, thereby providing a significant reduction in the visibility of the raster lines. In accordance with the present invention, as described in greater detail below, the prismatic screen may be either a flat or curved structure, depending upon the choice of additional optical elements in the system.

A number of designs on how to magnify a video small screen image to a larger screen image are described in patent literature. For example U.S. Pat. No. 2,449,886 and U.S. Pat. No. 5,061,052 disclose such systems. Each of these designs are based on using a positive lens, or a lens combined with a Fresnel lens, and each technique places the optical system near the front video monitor screen. The lenses are designed with a short focal length which may cause distortion, because the magnification of the image is not equal in the center and on the edges. Additionally, the Fresnel lens, which is a concentric design of a magnifying lens, may cause image degradation by lowering the image resolution. According to U.S. Pat. No. 5,061,052, the described system is intended to allow individuals of limited means to enjoy the entertainment and education provided by large screen television images, without the necessity of purchasing a large television set. However, such prior art television magnification of a small screen image to a larger screen image may cause distortion and a poor image, particularly since these systems magnify the raster of scanned video lines which make up the image. When the lines are magnified, the image is degraded and becomes distorted, and eye strain may result. These and other disadvantages of the prior art are overcome by the present invention.

BRIEF OBJECTS AND SUMMARY OF THE INVENTION

It is a primary object of the present invention to provide depth of field viewing of video images on any size video monitor.

It is a further object of the present invention to provide a system which is designed optically to enhance depth cues and to give additional detailed information about the viewed image.

It is another object of the present invention to provide a magnification of the image which separates the viewer's eye focus and convergence.

It is yet another object of the present invention to provide a magnification for any size television screen image which is not more than 1.5× to 2.0×, which is below measurable magnification distortion, without magnifying the visibility of the space between scan lines.

The preferred embodiment of the present invention achieves these and other objects with a system which includes a prismatic screen which causes a viewer to interpret depth cues present in a flat image as if they provided real depth information. Magnification of the image and increased image quality may be provided in accordance with the present invention by a magnifying lens arranged adjacent the prismatic screen. Special housings and optical coatings may be provided to further enhance image quality. Additionally, the housing and optical elements may be tilted to strengthen the depth cue information.

BRIEF DESCRIPTION OF THE DRAWINGS

The foregoing objects, as well as additional objects, features and advantages of the present invention, will be apparent from the following detailed description of the preferred embodiments when read in light of the accompanying drawings, wherein:

FIG. 6A is an illustration of an embodiment of the present invention with the lens 4 made in BK7 glass;

FIG. 6B is an illustration of another embodiment of the present invention with the lens 4 made with high refraction index SK16 glass;

FIG. 7 is an illustration of yet another embodiment of the present invention with the lens 4 designed as a hollow optical structure which is filled with a liquid high refraction index filler;

DETAILED DESCRIPTION OF THE PREFERRED EMBODIMENTS

Figure 1:
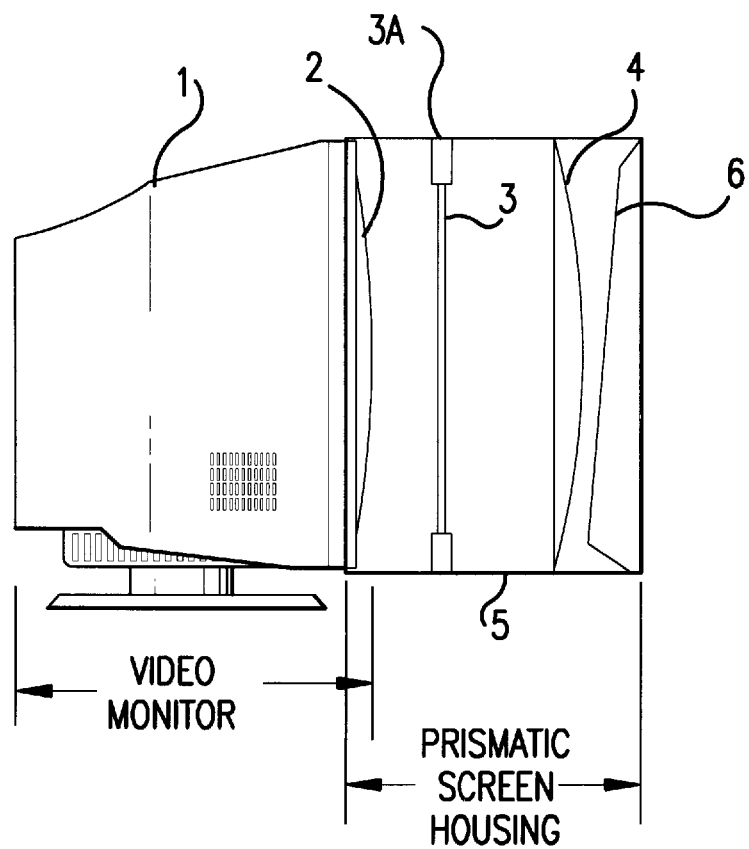
FIG. 1 is an illustration of the present invention including the magnifying lens 4.

Although the present invention is described below in connection with specific preferred embodiments, it will be appreciated that the invention is not limited to the described embodiments. For example, the present invention is housed and the optical elements are aligned with high precision in a frame which is constructed in height and width to be attached to the front of any existing video monitor. However, other techniques for housing and mounting the optical elements may also be used.

The present invention, when attached to a 19" or 13" medical video monitor, is designed to permit the viewer to observe the 2" diameter, micro endoscopic image as described in U.S. Pat. No. 5,400,177, magnified 1.5× to 2.0×. The image also appears to the viewer with improved resolution, with enhanced image detail and image depth cues, which are not recognizable in a less detailed video image.

In Laparoendoscopic/Endoscopic surgery procedures, the video image is transmitted directly from the inside of the patient's body to a 19" or 13" video monitor. Of particular importance is Micro Endoscopic procedures which are viewed through a micro fiber optic image conduit. The image is typically taken in a relatively low light environment, and the final image that appears on the 19" medical monitor is only 2" in diameter and is often noisy and characterized by relatively poor resolution quality.

Micro Endoscopic procedures for the Parotid tear duct, Lacrimal tear duct, breast exploration and reconstructive surgery, disorders of the spine, Neurosurgery of the brain and nerve system, inner ear, nose and throat (Otolaryngology), reconstructive plastic surgery, Fallopascopy, Gynecology, reproductive genetics and minimally invasive veterinary surgery are performed using scopes with fiber optic bundles that range in diameter from 0.3 mm to 3.0 mm. These difficult procedures have opened new avenues of improvement on surgery of the human body. Such procedures eliminate the need to open large operation areas and allows to reach into and see inside very small and narrow body ducts. It also reduces the patient's trauma, stress, danger of infection, and allows the patient in most cases to recover quickly.

With all the latest improvements in the lens, fiber optic, video camera, high resolution video monitor and actual technique in the different micro procedures the image quality transmitted to the video monitor often remains poor. The relatively poor quality is not only caused by the small size of the viewed image, but also results from poor sharpness and clarity of the image. This is the result of the lens at the end of the fiber optic conduit being only a minimum $\frac{1}{50}$th of an inch in diameter of the environment in which the image is taken.

The 2" micro image transmitted through the fiber optic is focused into the video camera as a relatively small and dark image. The image is only $\frac{1}{6}$th of the height of a 19" monitor screen, and occupies only $\frac{1}{40}$th of the monitor screen surface. However, the 19" monitor is the monitor of choice for most surgeons for Micro Endoscopic procedures because on the 13" monitor the micro image is only 1.5" in diameter. It is often very difficult to perform micro procedures with such a small image.

Both the 19" and 13" medical video monitor images are constructed with the same components, the video image pixels (small electronic dots which form the raster of scanning lines which form the image). Both 19" and 13" basic video monitors contain the same amount of 200 scanning resolution lines. A raster scanning line, which runs the width of the video screen, is approximately 1.0 mm high, $\frac{1}{25}$th of an inch; and the space between the raster lines is normally 0.5 mm, $\frac{1}{50}$th of an inch. The thickness of the lines and the space between the lines creates 200 scanning lines of basic image resolution that fills, top to bottom, the video monitor screen.

In comparing the video image with a film image, the video image resolution is as much as 15 times lower. Quality photographic lenses are usually manufactured with 100 times better resolution (100 lines per 1.0 mm).

Normal endoscopic video systems project the image to the full size of the video screen. This is because they are not restricted to the $\frac{1}{24}$th of an inch diameter of the fiber optic light conduit and are equipped with a powerful light source to illuminate the viewing area. This, however, is impossible to achieve with the micro endoscopic imaging systems.

The micro endoscopic video system is an electronic and optical breakthrough in surgical technique that allows the small, confined areas of the human body like the tear duct and the spinal canal to be imaged. However, the poor image quality and its 2" diameter size has limited its application and effectiveness. It is for this reason that the present invention achieves significant improvement over the deficiencies of prior art television screen magnification screen systems and is an extension to micro endoscopic technology, which helps solve the surgeon's needs for an enlarged, enhanced quality, depth of field image as viewed on the video monitor screen.

Although the preferred embodiments in this application and U.S. Pat. No. 5,400,177 are described in connection with medical imaging systems, applicability of the present invention may also be found in surveillance systems for gas and oil lines and sewers, which range in size from 6 inches to 36 inches, building structure inspection, interior of mechanical motor inspection, military and police heat sensor night vision, military and commercial ship underwater surveillance, smart bomb testing, outer space transmissions that are viewed on a video monitor, commercial television, any future high definition television systems, and other environments in which image magnification, depth of field and/or improved image clarity and contrast are important. Other areas of application will be readily apparent to skilled artisans.

Referring now to FIG. 1, a 19" video monitor 1, includes a video screen 2. A housing 5 is attached in front of the video screen 2, and contains the mounted depth of field prismatic screen 3. The screen 3 is assembled in a frame 3A. As described in copending application No. 08/155,748, the depth of field screen is a multi prismatic structure with a plurality of horizontal micro prisms which extend across the width of the inner surface of the depth of field screen 3. Particular reference is made to FIGS. 5–12, 25–36 and 39 of that patent and the accompanying written specification for a more detailed description of the depth of field screen.

In the preferred embodiment of present invention, a magnifying lens 4 placed in the front portion of the housing 5 provides stronger depth cue enhancement and magnifies the image for easier viewing. In relation to the 2" diameter micro image, the magnification does not exceed 2.0×. In relation to a full screen video image, the magnification does not exceed 1.5×. In accordance with the present invention, the prismatic screen 3 and the lens 4 are designed as a single optical system. Without the prismatic screen, the lens 4 would magnify the image as well as the raster scan lines, making the image unacceptable. The prismatic screen as described in U.S. Pat. No. 5,400,177 without the lens 4, does not magnify the image 1.5× to 2.0×.

The housing 5 attaches the optical elements to the front of the video monitor. Preferably, the front and rear portions of the housing are sealed with front and rear tempered glass windows, respectively, which are treated with anti-reflection coatings. The lens 4 may be an acrylic plano convex lens which is designed to provide focus and convergence separation. The focal length of the lens 4 is relatively long, preferably about 30 inches, but advantageously may range from 10" to 40". The lens 4 is preferably mounted about 5 inches from the video screen.

The prismatic screen 3, described fully in parent U.S. Pat. No. 5,400,177 (incorporated herein by reference) is placed between the lens 4 and the video screen to provide additional focus and convergence information, and to reduce the size of video raster lines by three times. The prismatic screen is preferably mounted near the video screen with the "rows" of prism lenses running parallel to the video scan lines. The interior portion of the housing is preferably blackened to separate the viewed image from ambient light and reflections, which also helps to strengthen depth cues. Preferably, the outside front portion of the housing includes a black frame which tilts the optical front window by 5° to 10° toward the inside of the housing to help eliminate reflections of bright objects and ambient light that may be present in front of the glass window.

The manner in which viewers eyes perceive depth cues is described in U.S. Pat. No. 5,400,177 with particular reference to FIGS. 13 to 22. In the same patent, the manner in which the prismatic screen reduces the raster of video scanning lines is described with reference to FIGS. 31 to 36B. In the present invention, the plano convex lens 4, when combined with the prismatic screen also serves as a depth cue enhancement lens. The screen 3 and the lens 4 are designed as a single optical system 3–4.

Figure 2:
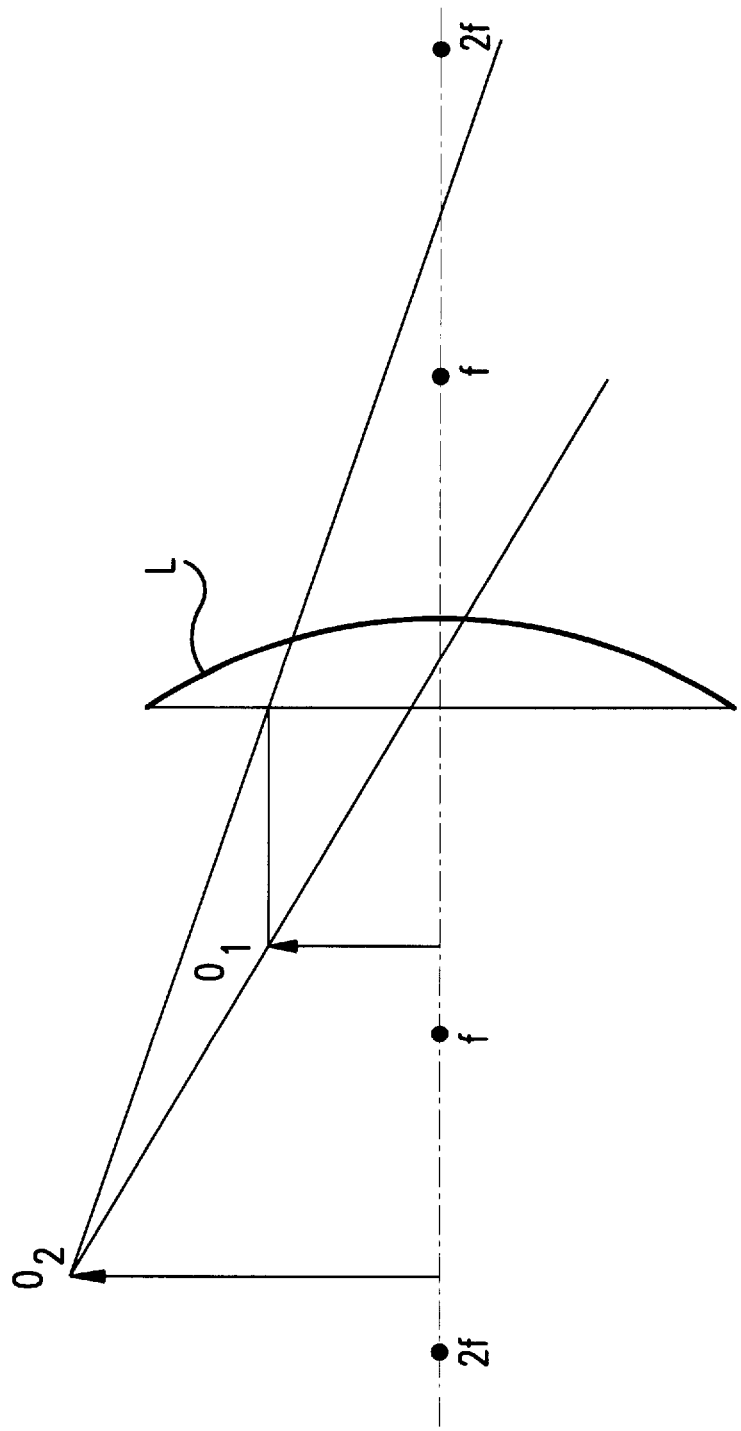
FIG. 2 is an illustration of how a plano convex lens magnifies an image.

FIG. 2 illustrates how a plano convex lens magnifies a video image. A viewed object $O_1$ is magnified by the lens L to provide a magnified object image $O_2$. In the preferred embodiment, the eye viewing distance to the lens is variable and the focal length of the lens is preferably a relatively long focal length.

Figure 3:
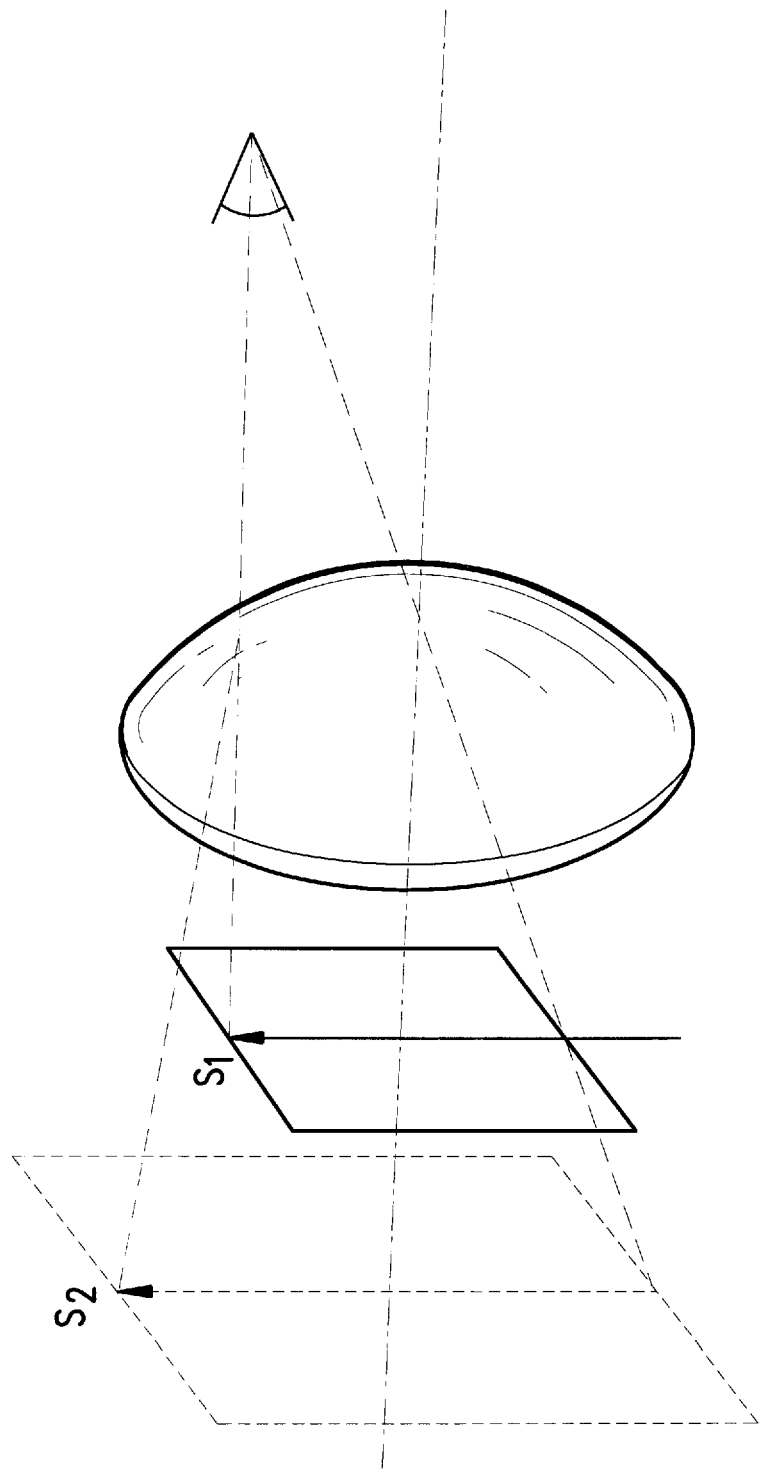
FIG. 3 is an illustration of how the plano convex lens magnifies the video image in accordance with one aspect of the present invention.

FIG. 3 illustrates how the long focal length lens is used in the present invention. In a preferred embodiment, the magnification of the video screen S1, to the virtual image S2, is accomplished with a 25 inch diameter lens having a focal length of 762 mm and placed at the distance of 126 mm from the video screen. Since the primary object in the design of the lens is to strengthen the depth cues in the video image, the magnification can be kept as low as 1.5×, which is below the distortion range caused by image magnification.

Figure 4:
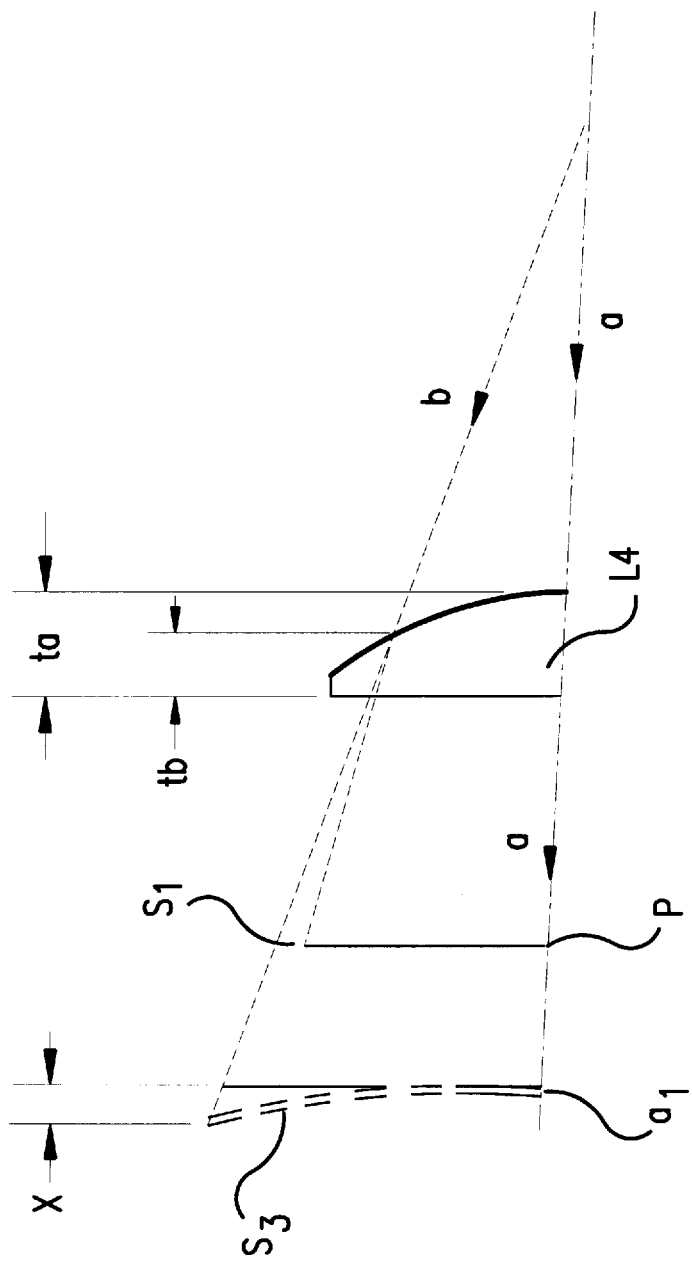
FIG. 4 is an illustration of how the magnifying lens 4 enhances the depth cues of the viewed video image.

FIG. 4 illustrates the manner in which depth cues are enhanced. When a light beam passes through a transparent structure of glass or plastic, depending on the refraction index and the thickness of the structure, the image will focus at a shorter distance. When the structure is a plano convex lens, the image will be focused at a shortened distance "a" at the center of the lens, where the lens is thicker. Light passing through the thinner peripheral portions of the lens will be focused at "b". By using BK7 glass, which has a refraction index of 1.5163, the effective length of the light beam is shortened by about ⅓ of the BK7 glass thickness, and less at the edge of the lens.

A planar image p at the location of the screen S1 is seen through the lens 4 as a slightly curved image S2. This added curvature separates focus and convergence distances perceived by the eye and enhances the depth cues present in the planar image. As shown in FIG. 4, a light beam a passing through the central portion of the lens 4 encounters a lens thickness $t_a$. On the other hand, the light beam b passes through a peripheral portion of the lens 4 having a reduced thickness $t_b$. The lens causes focus displacing (shifting) across the image of BK7 glass approximately $X=t_a/3 - t_b/3$. The shifting "X" causes an inconsistent reading of the eye focus and convergence relative to the planar video image p.

The image shifting caused by the lens provides a similar effect to the prismatic screen as described in U.S. Pat. No. 5,400,177. The lens and the prismatic screen combined into a single optical system causes an increased focus and a convergence displacement, which cuts off the convergence ability of the eyes to indicate to the viewer that the video image is flat. This allows the brain to analyze the depth cues to be perceived as real depth.

Figure 5A:
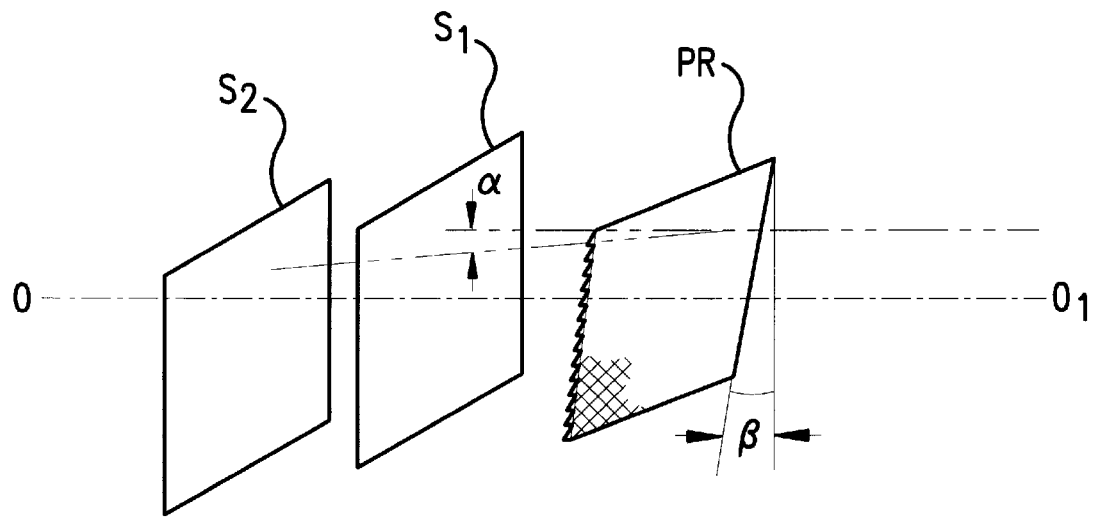
FIG. 5A is an illustration of the location of the prismatic screen in front of the video screen as illustrated in application Ser. No. 08/155,748.

FIG. 5A illustrates the arrangement in U.S. Pat. No. 5,400,177 of the prismatic screen PR, the video screen S1 and the virtual image S2. The virtual image S2, appears behind the video screen S1, shifted down by the angle alpha. This image shifting is also related to the tilt of the prismatic screen angle beta. A typical value for the angle beta would be approximately 60°.

Figure 5B:
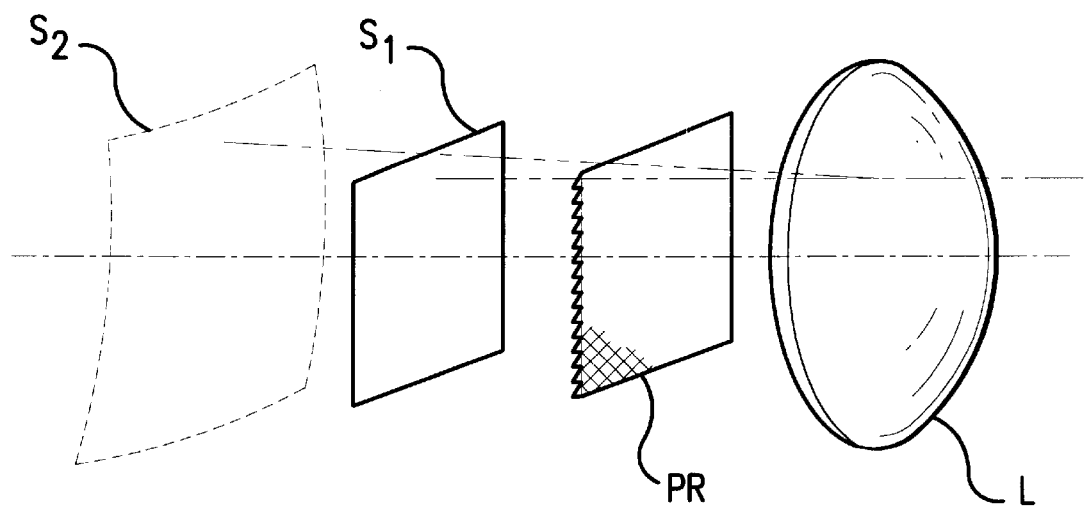
FIG. 5B is an illustration of one embodiment of the present invention with the lens 4 placed in front of the prismatic screen.

FIG. 5B illustrates the optical system of FIG. 5A combined with the lens L into a single optical system. The resultant virtual image S2 is magnified, causing a stronger focus and convergence displacement, and therefore a stronger depth cue effect enhancement. In addition, as described in the U.S. Pat. No. 5,400,177, particularly with reference to FIGS. 29 to 36b, the prismatic screen PR preferably includes three miniature prisms for each video scan line. As a result, each raster video scanning line is divided into three, thereby providing a significant reduction in visibility of raster video scanning lines.

Figure 5C:
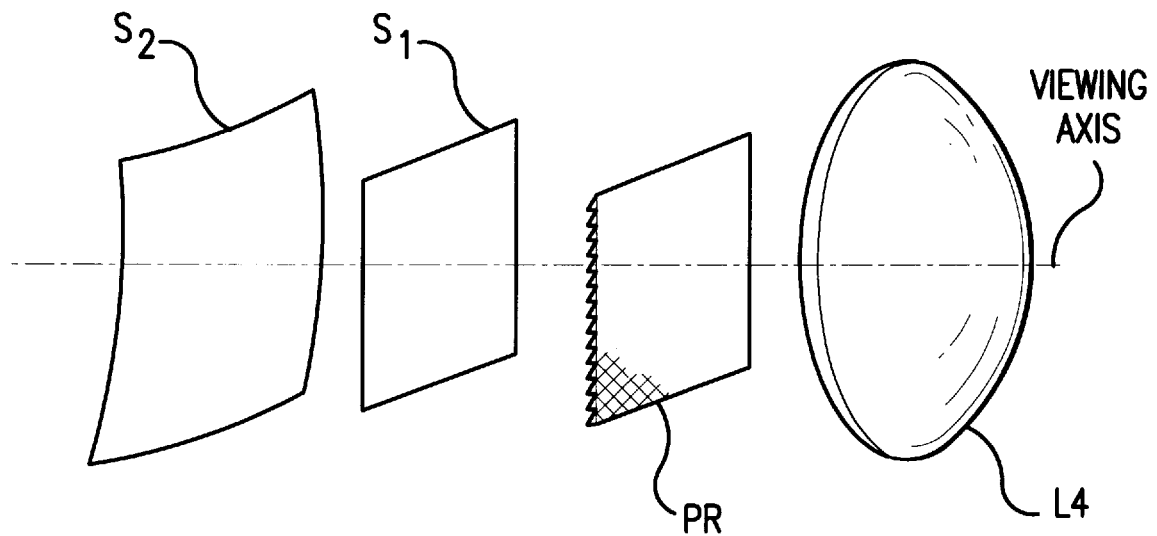
FIG. 5C is an illustration of an embodiment of the present invention with the lens 4 and the curved prismatic screen "PR" in place.

FIG. 5C illustrates a design configuration similar to that shown in FIG. 5B, but the prismatic screen PR is curved from side-to-side along the horizontal axis. To accommodate the curved prismatic screen PR, the lens L is changed from spherical to non-spherical, and is designed to follow the curve of the prismatic screen. This arrangement corrects image distortions for an increased angle of viewing of the image.

Figure 5D:
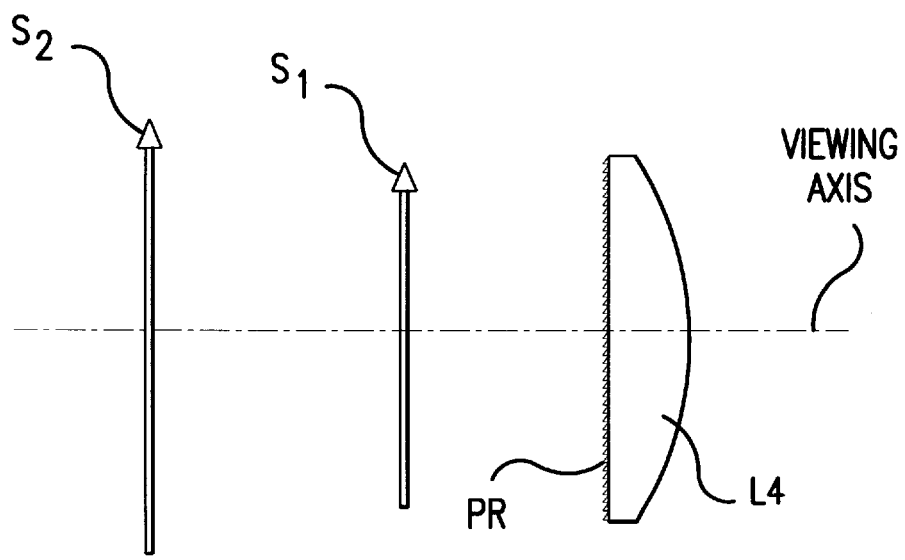
FIG. 5D is an illustration of an embodiment of the present invention with the lens 4 and the prismatic screen "PR" applied to the plano surface of lens 4.

FIG. 5D illustrates a side view of another configuration similar to the arrangement of FIG. 5B. As shown in FIG. 5D, the prismatic screen PR may be applied directly to the plano surface of the plano convex lens L by any known technique. For example, the micro prisms may be etched, rolled or milled with high precision directly in the surface of the lens 4. Alternatively, the prisms could be mechanically or chemically attached appropriately to the lens. S1 is the video image, S2 is the magnified video image.

Figure 5E:
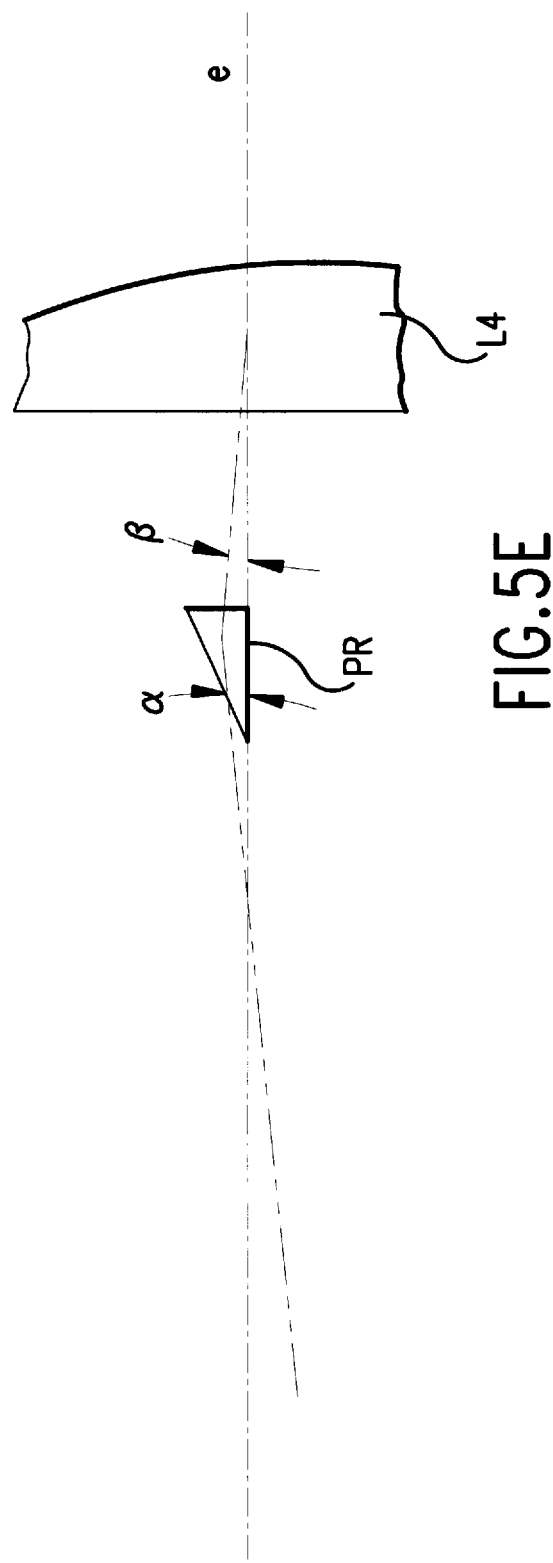
FIG. 5E is an illustration of an embodiment of the present invention with the light path "e" passing the lens L4 and the single prism of the prismatic screen "PR"

FIG. 5E illustrates the light beam path being directed by the lens 4 and by a single prism section of the prismatic screen PR. The light beam from the lens 4 enters the prism on the angle beta, thereby modifying the prismatic screen's design angle alpha, according to the focal length and the refraction index of the lens 4.

Figure 5F:
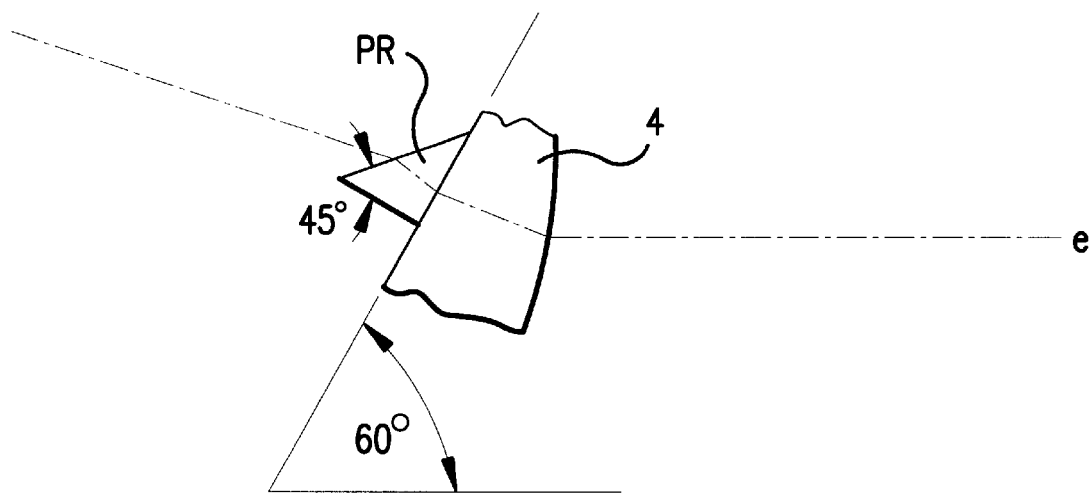
FIG. 5F is an illustration of an embodiment of the present invention wherein the light path "e" passes angled lens 4 and a single prism of a prismatic screen PR laminated to the lens.
Figure 5G:
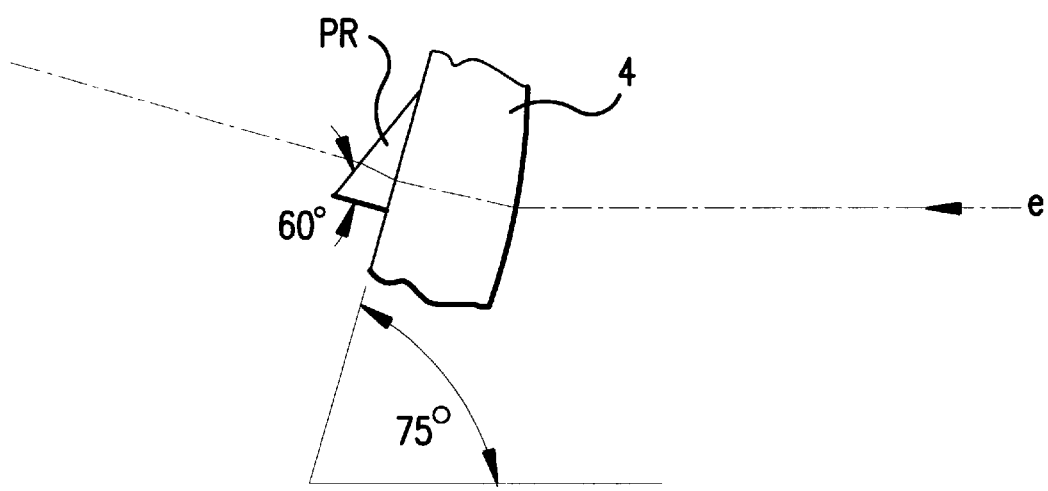
FIG. 5G is another illustration of an embodiment with a prismatic screen laminated to the lens 4, wherein the angles of the prism and the lens 4 have been changed from those of FIG. 5F.

FIG. 5F shows a section of lens 4 which is laminated, cemented, rolled, etched or milled directly to the prismatic screen PR. For clarity, only a section of the prismatic screen is illustrated. The prismatic screen has a prism angle of 45° and the plano surface of the lens 4 is tilted 60° from the viewing axis. FIG. 5G illustrates an alternative embodiment wherein the prismatic screen PR has a prism angle of 60° and the plano surface of the lens is tilted 75° from the viewing axis. Assuming a horizontal viewing axis, the lens 4 is preferably placed in a more upright position as the prism angle increases.

FIGS. 6A, 6B and 7, show different designs of the lens 4. FIG. 6A illustrates the same lens 4 described in connection with the system of FIG. 5B. In FIG. 6B, the lens 4, instead of being made from BK7 glass (having a refraction index of 1.5163), is made with SK16 glass which has a higher refraction index of 1.6204. The lens also can be made from acrylic and polycarbonate plastic materials having a relatively high index of refraction. By using a material with a higher refraction index the center thickness (FIG. 6B) and therefore the weight of the lens can be reduced.

FIG. 7 illustrates a design of a hollow plano convex lens which is similar to the lens in FIG. 5B. The lens is manufactured as an empty, molded, cut and polished element which is then filled with a high refractive index liquid and sealed. Even with difficulties in sealing the edges to prevent leaking of the high index liquid, this design is still cost efficient and reduces the weight of the entire system.

Figure 8:
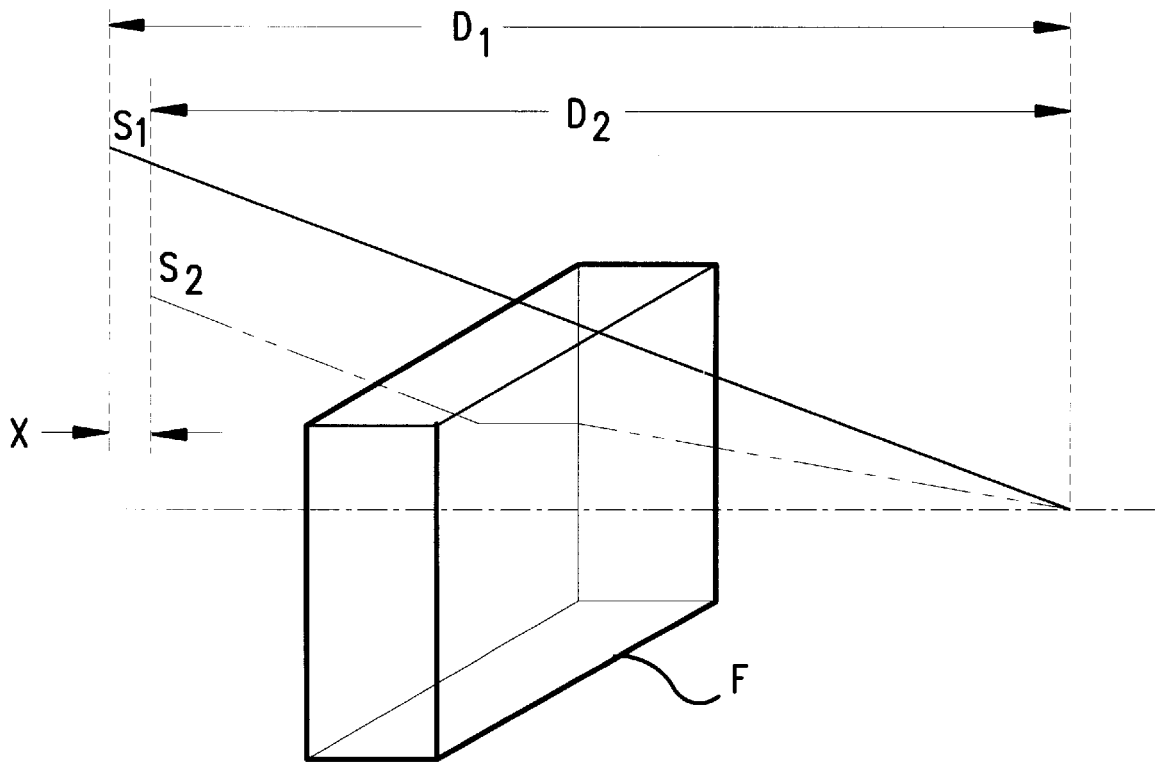
FIG. 8 is an illustration of the present invention with the lens 4 replaced by a parallel transparent plate.
Figure 8A:
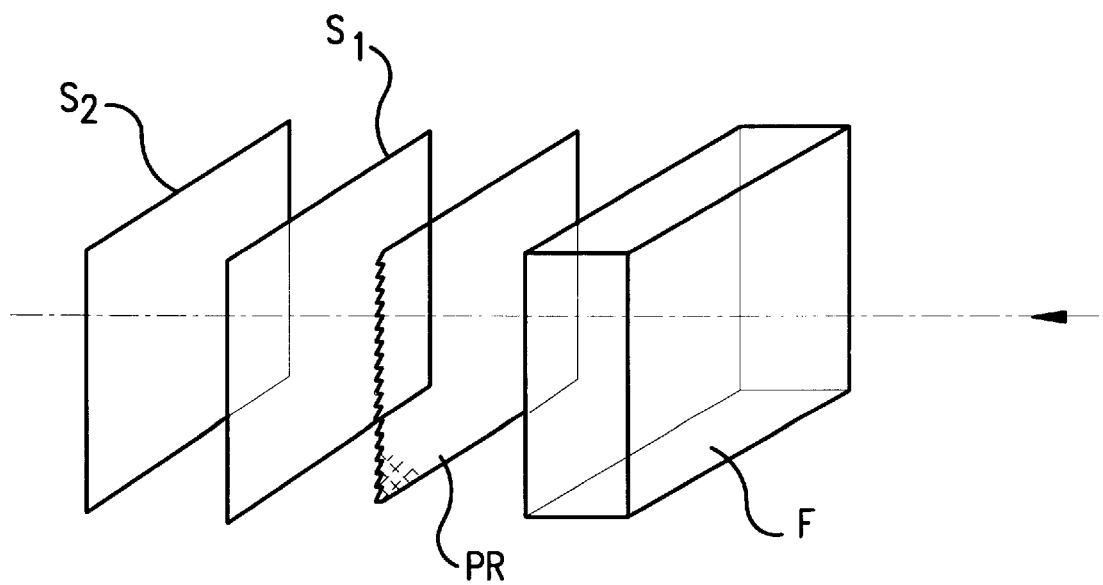
FIG. 8A is an illustration of an embodiment of the present invention with the prismatic screen "RP" placed behind the transparent plate.

Referring now to FIG. 8, when magnification of the video image is not desired or needed, the lens 4 may be replaced with an optically flat plate F having a thickness, for example, of 1 inch. The thick plate operates in a manner similar to the lens 4 by shortening the length of the light beam passing through the transparent plate by approximately ⅓ of the glass thickness;

$X=D_1-D_2$. As illustrated in FIG. 8A, the virtual image S2 appears in front of the video screen S1. As with the systems utilizing the plano convex lens, the system of FIG. 8A causes a focus and convergence displacement which enhances the depth cues of the viewed image.

Figure 9:
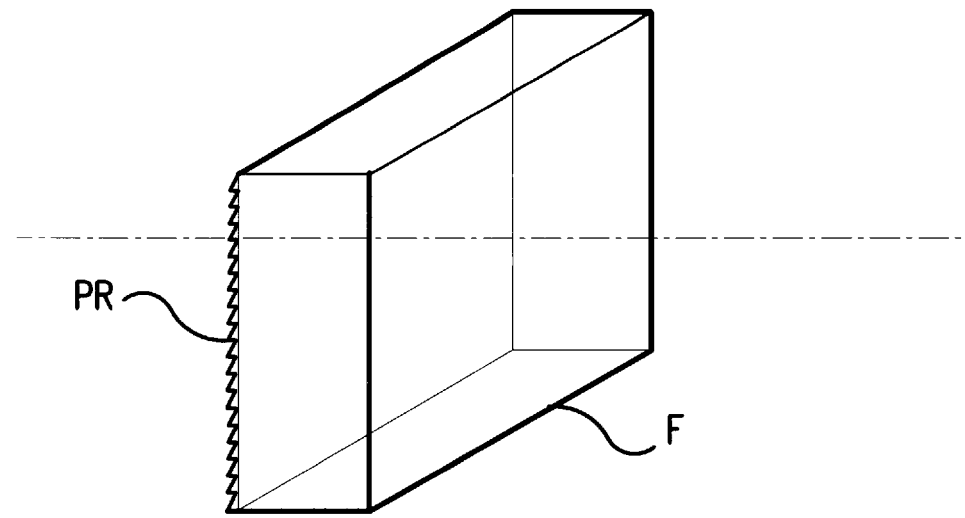
FIG. 9 is an illustration of the present invention with the prismatic screen "PR" attached to the parallel transparent plate.
Figure 9A:
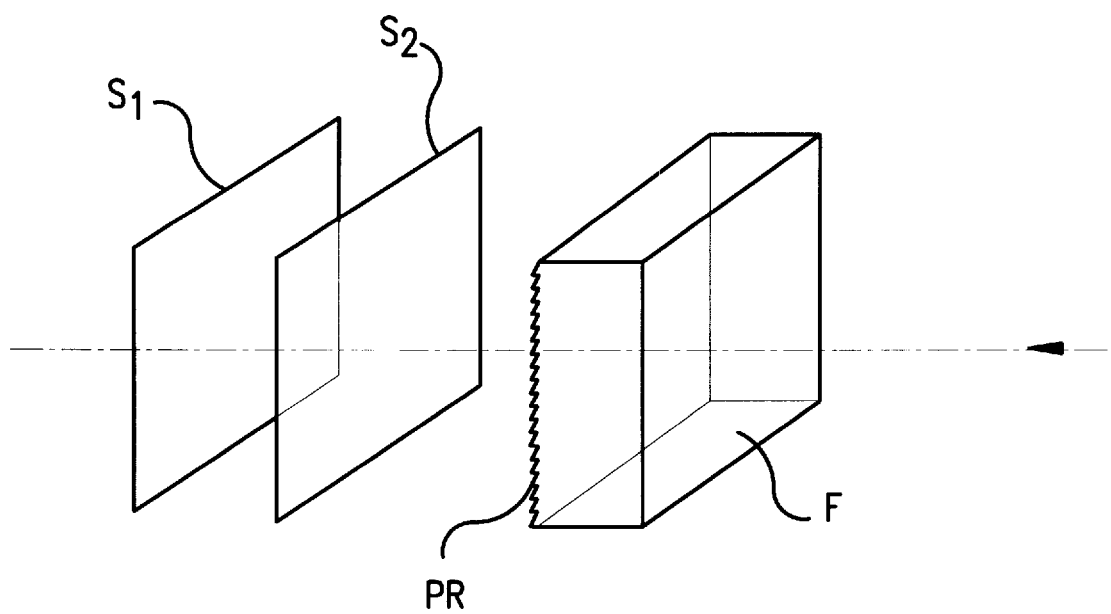
FIG. 9A is an illustration of the present invention with the parallel transparent plate demonstrating how the viewers eyes see the virtual video image S2, which appears in front of the video screen S1.
Figure 10:
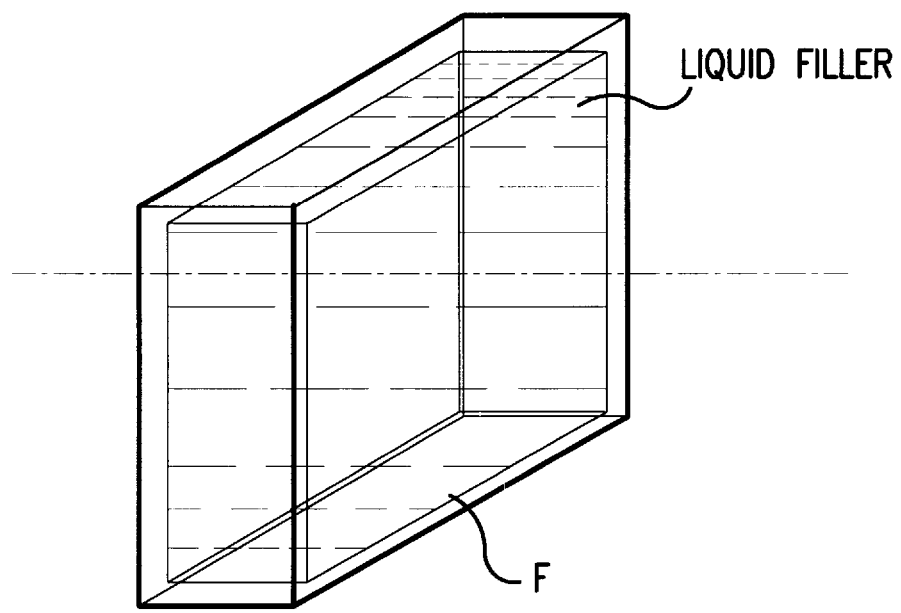
FIG. 10 is an illustration of the present invention with the parallel transparent plate which is hollow and is filled with a liquid high refraction index filler.

FIGS. 9 and 9A illustrate the plate from FIG. 8 with the prismatic screen surface PR, applied to the flat surface of the transparent plate F. FIG. 10 shows the optically flat plate replaced by a hollow molded or cut plate which is filled with a high refraction index liquid and sealed.

The principles, preferred embodiments and modes of operation of the present invention have been described in the foregoing specification. The invention which is sought to be protected herein, however, is not to be considered as limited to the particular forms disclosed, since these are to be regarded as illustrative rather than restrictive. Variations and changes may be made by those skilled in the art without departing from the spirit of the invention. For example, the present invention is not limited to viewing of a video screen image, but may be used in viewing any image which includes recorded depth cues. Such images include computer images, high definition television images, projected film images, still photographs and slides, transparencies, printed images and works of art.

What is claimed is:

1. An apparatus for depth of field viewing of a flat image by restructuring the image to restore depth in the image through interchange of perceived depth cues in place of stereopsis, comprising:

a transparent screen for positioning between a flat image and a viewer, said transparent screen including a plurality of generally parallel formed in said transparent screen and extending horizontally across the width of the screen, each of said microprisms being vertically spaced one above the other; and an optical element positioned between said transparent screen and the viewer, said optical element operable to adjust the effective paths of light transmitted through said transparent screen.

2. The apparatus of claim 1, wherein said optical element is a plano convex lens.

3. The apparatus of claim 2, wherein said lens is formed from a material having a refractive index of approximately 1.5163.

4. The apparatus of claim 2, wherein said lens is formed from a material having a refractive index of approximately 1.6204.

5. The apparatus of claim 2, wherein said lens has a refractive index of at least 1.5.

6. The apparatus of claim 2, wherein said lens has a focal length of at least 10 inches.

7. The apparatus of claim 6, wherein said lens has a focal length in the range of 10 inches to 30 inches.

8. The apparatus of claim 7, wherein said focal length is approximately 30 inches.

9. The apparatus of claim 2, wherein said microprisms form prism in the range of 30° to 80° and said convex lens magnifies the viewed image from approximately 1.5 to 2.0 times.

10. The apparatus of claim 1, wherein said optical element is a transparent plate having spaced parallel faces.

11. The apparatus of claim 10, wherein said transparent plate is formed from a material having a refractive index of approximately 1.5163.

12. The apparatus of claim 10, wherein said transparent plate is formed from a material having a refractive index of approximately 1.6204.

13. The apparatus of claim 10, wherein said transparent plate has a refractive index of at least 1.5.

14. The apparatus of claim 10, wherein a liquid material having a refractive index of at least 1.5 is provided between the spaced faces of said transparent plate.

15. The apparatus of claim 1, wherein said transparent screen is curved across the width of the screen and said optical element is a non-spherical convex lens.

16. The apparatus of claim 1, wherein said optical element is provided as part of said transparent screen.

17. The apparatus of claim 16, wherein said optical element is a plano convex lens, and said plurality of parallel microprisms is formed in the plano surface of the lens.

18. The apparatus of claim 17, wherein said microprisms have prism angles in the range from 40° to 90°, and wherein said lens is tilted in the range from 60° down to 0° relative to an axis parallel to the vertical axis of said flat image.

19. The apparatus of claim 17, wherein said microprisms have prism angles in the range from 40° down to 5°, and wherein said lens is tilted from 60° up to 90° relative to an axis parallel to the vertical axis of said flat image.

20. The apparatus of claim 16, wherein said optical element is a transparent plate having spaced parallel faces, and said plurality of parallel micro prisms is formed in the plano surface of the plate.

* * * * *

UNITED STATES PATENT AND TRADEMARK OFFICE
CERTIFICATE OF CORRECTION

PATENT NO. : 5,774,260
DATED : June 30, 1998
INVENTOR(S) : Petitto, et al.

It is certified that error appears in the above-identified patent and that said Letters Patent is hereby corrected as shown below:

Column 8, line 24, after "parallel" insert --microprisms--.

Signed and Sealed this

Twenty-seventh Day of October, 1998

Attest:

BRUCE LEHMAN

*Attesting Officer*     *Commissioner of Patents and Trademarks*